United States Patent [19]

Bordener

[11] Patent Number: 5,766,500
[45] Date of Patent: Jun. 16, 1998

[54] ADJUSTABLE DIVIDER ASSEMBLY FOR USE WITH AN OPEN-TOP MOLD FOR CREATING A COUNTERTOP WITH A BUILT-UP EDGE

[75] Inventor: Robert Bordener, Bloomfield Hills, Mich.

[73] Assignee: Talon Surfaces, LLC, Troy, Mich.

[21] Appl. No.: 596,662

[22] Filed: Feb. 5, 1996

[51] Int. Cl.$^6$ ................................................. B29C 39/20
[52] U.S. Cl. .................... 249/117; 249/154; 249/155; 249/158; 249/170; 264/255; 264/308
[58] Field of Search ........................... 249/117, 154, 249/155, 158, 160, 161, 170; 264/254, 255, 308

[56] References Cited

U.S. PATENT DOCUMENTS

| | | | |
|---|---|---|---|
| 779,219 | 1/1905 | Hartwick | 249/158 |
| 2,250,839 | 7/1941 | Perry | 249/155 |
| 2,558,615 | 6/1951 | Johnson | 249/158 |
| 2,674,888 | 4/1954 | Simonet | 249/158 |
| 3,530,540 | 9/1970 | Mueller | 249/160 |
| 3,737,268 | 6/1973 | Ryder | 425/444 |
| 3,761,554 | 9/1973 | Barnette | 264/69 |
| 4,981,428 | 1/1991 | Herring, Sr. | 425/253 |
| 5,253,932 | 10/1993 | Nesovic | 312/140.3 |
| 5,316,715 | 5/1994 | Gray | 264/245 |
| 5,372,491 | 12/1994 | Fritsch et al. | 425/130 |
| 5,628,949 | 5/1997 | Bordener | 264/255 |

*Primary Examiner*—Jay H. Woo
*Assistant Examiner*—Joseph Leyson
*Attorney, Agent, or Firm*—Gifford, Krass, Groh, Sprinkle, Patmore, Anderson & Citkowski, P.C.

[57] ABSTRACT

An adjustable divider assembly for use with an open-top mold for creating a countertop with a built-up edge, the mold being rectangular in shape with a flat planar surface, first, second and third built-up and inwardly contoured edges and a fourth open edge. A U-shaped divider bar includes a central elongated member and first and second side elongated members which is pivotally attached along the four open edge of the mold using a pin and slot type arrangement and is rotated into the mold so that the elongated members of the divider bar are arranged in a desired spaced apart fashion relative to the opposing contoured mold surfaces. Suspending members extend forwardly from the central elongated member and position the bar at an elevated position above the planar mold surface. A first pour of plasticized resinous material is applied over the planar mold surface according to a predetermined depth, following which the divider bar is attached and rotated into an installed position within the mold. A second pour of material fills a channel defined by the spacing between the divider bar and contoured mold surfaces to create the built-up edge.

7 Claims, 4 Drawing Sheets

5,766,500

ADJUSTABLE DIVIDER ASSEMBLY FOR USE WITH AN OPEN-TOP MOLD FOR CREATING A COUNTERTOP WITH A BUILT-UP EDGE

BACKGROUND OF THE INVENTION

1. Field of the Invention

The present invention relates generally to mold devices for creating a countertop mold and, more particularly, to an adjustable divider assembly for use with an open top gravity mold for creating a countertop with a built-up edge and a method for creating a countertop utilizing the divider assembly.

2. Description of the Prior Art

Various different kinds of mold assemblies are known in the art for creating custom countertops according to dimensions fixed by the size of the given mold. Such molds are useful for producing countertops having either a flattened surface with or without centrally formed apertures for receiving a separately produced sinkbowl and faucet hardware or for producing a countertop with a flattened outer rim portion with a central bowl shaped portion which produces a one piece countertop and sink.

Open molds comprise one type of mold which are popular for the production of standard sized countertops and allow for relatively high production rates. Unfortunately, most open type molds do not allow for the production of a countertop having a thickened outer edge as is desired by most consumers. The thickened edge typically is formed as a round or arc shaped contour and provides the combined advantages of comfort and safety and significantly higher aesthetic value while also hiding from view the wood supports which are typically attached to the underside of the countertop and by which the countertops are attached atop a cabinet.

Closed molds are also used and usually consist of a top half and a bottom half which are clamped or press-fit together prior to the mold being filled with an appropriate resin matrix or other type material. The closed type mold can be configured for producing a countertop with a thickened edge however its primary disadvantage is that it only produces a countertop according to the dimensions fixed by the size of the mold. Therefore, a differently dimensioned closed type mold is needed for producing a countertop according to the desired specifications.

Another type of prior art mold comprises an open mold constructed of a teflon or other type of "non-stick" surface upon which is shaped a negative impression of the desired countertop. One or more of the inner facing edges of the semi-open mold is shaped as a negative of the rounded countertop edge. The procedure includes the steps of establishing an enclosed barrier which utilizes all or part of the enclosed mold by releasably securing a number of dividers in the arrangement desired. An initial pour is made to produce the top surface of the countertop. Following sufficient drying and gelling of the first pour, an appropriately configured separating bar member is secured atop the first pour in proximity to the inwardly facing edge of the mold and a second resin pour is then applied between the separating bar and the configured inner mold edge to create the thickened edge.

The above described process is an improvement over more traditional utilization of open type molds for creating a countertop product in that it can create a product according to more than one fixed set of dimensions. The major drawback however is the amount of time and effort which must be employed in measuring and setting up the mold, including installing the barriers and waiting for the first pour to sufficiently harden to permit the separating member to be attached for the final pour to create the thickened edge. Also, another disadvantage of this type of mold procedure is the low quality of the created product due to uneven thickness and lack of ability to produce straight and evenly consistent thickness of the countertop.

SUMMARY OF THE PRESENT INVENTION

The present invention is an adjustable divider assembly for use with an open-top mold for creating a countertop with a built-up edge which is an improvement over the above-described prior art methods by dramatically reducing setup time and waiting time between pours. The mold is substantially rectangular in shape having a substantially planar surface, first, second and third built-up and inwardly contoured edges and a fourth open edge. A U-shaped divider bar includes a central elongated member and first and second side elongated members.

The divider bar is pivotally attached to the mold along the fourth open edge by pin members which extend laterally outwardly from the first and second side elongated members and which are received within slotted portions formed into first and second mounting plates attached to the mold. The bar is rotated downward to seat the divider bar in the mold so that the elongated members are arranged in an opposing and spaced apart fashion relative to the inwardly contoured edges of the mold. Suspending members extend forwardly from along a top surface of the central elongated member and support the divider bar in a suspended manner and at a desired position above the mold planar surface. The length of the suspending members is sufficient to permit the divider bar to be slidingly translated from a rearward position to a forward position.

According to a preferred embodiment, a width divider equivalent to the length of the fourth side of the mold is slidingly inserted into the mold. A length divider which corresponds to the desired distance between the width divider and a parallel extending surface of the mold is inserted into the mold and defines a subset area in the mold according to the overall desired dimensions of the countertop to be produced.

In use, a first layer of a resinous plasticized material is poured across the mold planar surface divided by the width and length dividers and according to a predetermined depth. Following a predetermined time period in which the first layer is allowed to partially gel and cure, the divider bar is attached to the mold and is downwardly rotated until it contacts the top surface of the mold, at which point the underside of the bar is in contact with the top of the first pour. A second layer of material is subsequently poured into the space between the outwardly facing surfaces of the divider bar members and the inwardly contoured surfaces of the mold to create the built-up edge.

A method for creating a countertop utilizing the divider assembly is also disclosed and includes the steps of setting up the width and length dividers to define the desired subset area, pouring the first layer of material, attaching the bar and rotating it into its installed position within the mold, and pouring the second layer of material to create the built-up edge.

BRIEF DESCRIPTION OF THE DRAWING

Reference will now be made to the attached drawing, when read in combination with the following specification, wherein like reference numerals refer to like parts throughout the several views, and in which.

DESCRIPTION OF THE PREFERRED EMBODIMENT

Figure 1:
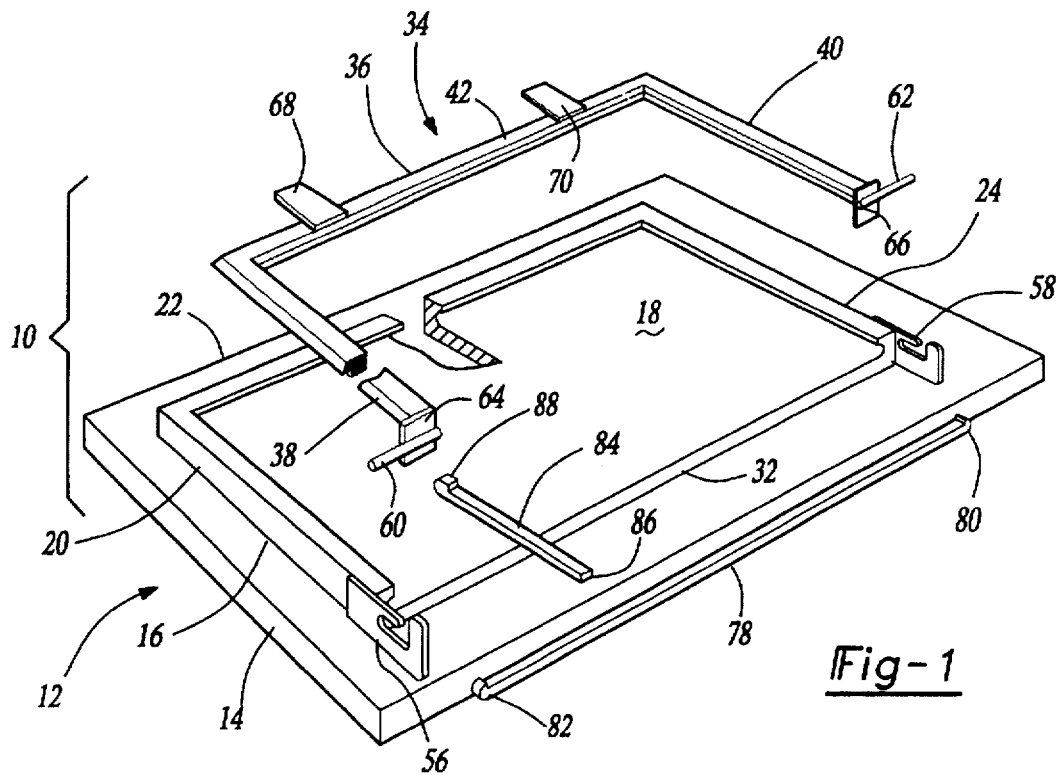
FIG. 1 is an exploded view of the open-top mold and adjustable divider assembly according to the present invention.
Figure 2:
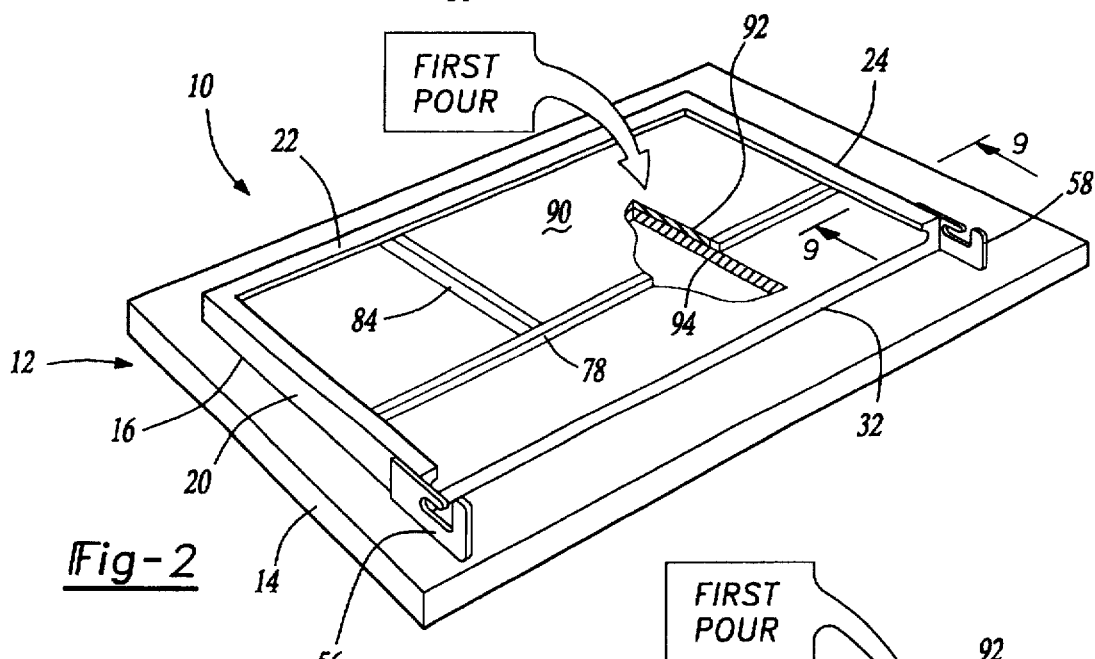
FIG. 2 is a view similar to FIG. 1 and illustrating the width and length dividers in place for creating a subset area within the mold according to the dimensions of the desired countertop.

Referring to FIGS. 1 and 2, an adjustable divider assembly 10 for use with an open-top mold 12 is shown for creating a countertop with a built-up edge according to the present invention. The mold 12 includes a flat planar support surface 14 such as a supported table top or other type of pedestal base. An open-top mold 16 is supported on the flat planar surface 14 and is shaped in a polygonal fashion, having any number of sides ranging from three up to infinity to form any type polygonal up to a circular shape.

Preferably, the mold 16 is formed in a generally rectangular fashion to create countertops for use in kitchens and baths. According to the most standard embodiment, the mold 16 is provided in a standard dimension having a length of 14 feet and a width of 30 inches. The mold 16 is constructed of any conventional type material customarily used in the molded countertop industry, such as a tooling gel covered material with the substrate being fiberglass or wood or other like material. The material content of the mold is important to ensure that the resin or other type of plasticized material which is introduced into the mold does not permanently adhere to the contacting surfaces of the mold. An open-top mold according to this construction and dimensions is therefore adequate for producing countertops of varying sizes for use in most kitchen and bath applications.

Figure 3:
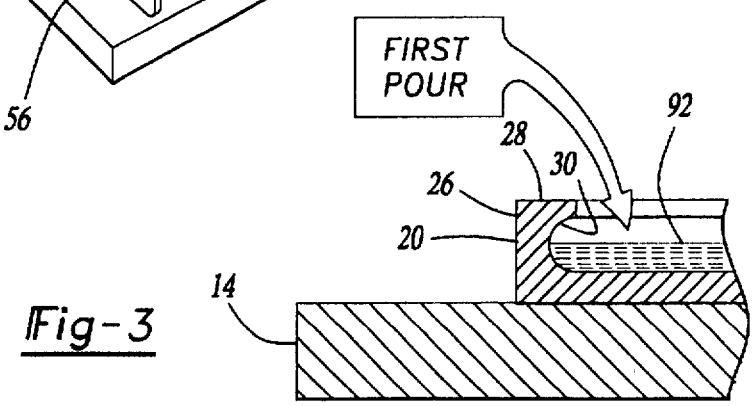
FIG. 3 is a cutaway view showing an inwardly contoured edge of the mold and the planar surface and showing a first pour of material according to a desired depth.

The open-top mold 16 has a flat planar surface 18 which is bounded on three sides by first 20, second 22 and third 24 inwardly facing and built-up contoured edge defining surfaces. Each of the edges 20, 22 and 24 are defined by a flat exterior surface, a flat top surface and an arcuately shaped inner surface. Referring to the mold cutaway view of FIG. 3, edge 20 is shown with flat exterior surface 26, flat top surface 28 and inwardly contoured and arcuately extending surface 30. As will be described subsequently, the contour of the mold edges provides the pattern for creating the built-up edge perimeter of the countertop product. Finally, a fourth open edge 32 is provided and is level with the flat planar surface 18 of the mold so that the fourth edge 32 terminates on either side in the built-up and inwardly contoured edges of the sides 20 and 24.

Referring again to FIG. 1, the divider assembly further includes a divider bar 34 for pivotally engaging and for seating within the mold in a supported and suspended manner in order to create a perimeter channel for forming the countertop's built-up edge. The divider 34 is formed in a generally U-shape configuration and is constructed of either a lightweight and non-stick metal or even a polymer or Teflon-like material which exhibits the necessary properties of durability and resiliency. Specifically, the bar 34 has a central elongated member 36 which terminates at opposite ends in first 38 and a second 40 rearwardly extending side elongated members. The side members 38 and 40 preferably extend in a substantially perpendicular fashion from the central member 36 and the bar 34 is dimensioned so that the central and side members are located in a spaced apart and opposing fashion relative to the associated inwardly contoured edges 20, 22 and 24 of the mold.

Figure 6:
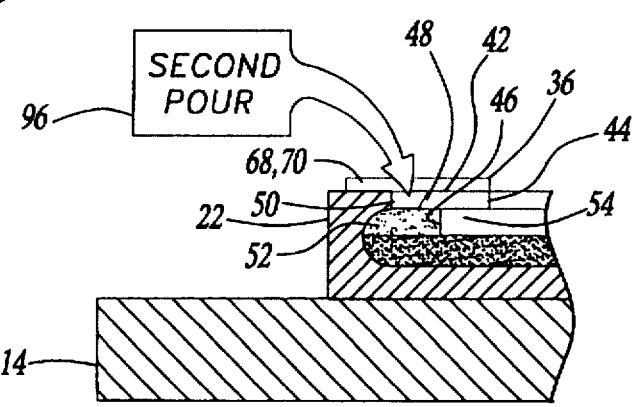
FIG. 6 is a view of the open-top mold in cutaway as shown in FIG. 3 and further illustrating a cross sectional view of the divider bar's central elongated portion and suspending members for positioning the divider bar at the desired elevation above the mold planar surface and also showing the second pour for creating the built-up edge.

Referring to FIG. 6, a cutaway is shown through the central elongated member 36 and the inwardly contoured edge 22 of the mold. Each of the central and side members of divider bar 34 is shaped in cross section substantially as shown in the view of FIG. 6. Specifically, the elongated member 36 is shown in cross section and includes a planar top surface 42, a planar rearwardly facing surface 44 and an outwardly facing and planar surface 46 which is positioned in a spatially opposed manner relative to the built-up contoured mold edge 22 and which defines the cross section for the creation of the countertop's built-up edge.

A pour defining portion 48 extends from the top surface 42 in a direction towards the associated mold edge 22 and terminates at a point short of the edge 22 to define therebetween a channel 50 for receiving a subsequent pour of material. An area, illustrated at 52, is shown in the cross section of FIG. 6 and defines the spatial boundary between the elongated member and the mold for creating the built-up edge. Each of the elongated side members 38 and 40 of the divider bar 34 and the opposing built-up edges 20 and 24 of the mold are arranged in cross section as shown in FIG. 6.

An alignment notch 54 is also shown formed into an underside of the central member rear surface 44 and extends a predetermined distance inwardly within the member 34. The notch 54 is according to the preferred embodiment formed only in the central elongated member 36 and is intended to receive an extending lip portion of a separately produced sink bowl (not shown) so as to provide a proper mating connection which is hidden from view when the countertop is installed atop a desired cabinet.

Referring again to FIG. 1, the divider assembly further includes a first mounting plate 56 which is attached along an outer surface of the first built-up edge 20 and a second mounting plate 58 which is likewise attached along an outer surface of the third built-up edge 24. The mounting plates 56 and 58 are each substantially flat and planar in shape and extend rearwardly beyond opposite ends of the fourth open edge 32. Within the portions of the mounting plates 56 and 58 which extend beyond the mold edge 32 are formed slotted channel portions for receiving the divider bar as will be subsequently described.

The divider bar 34 further includes a first laterally outwardly extending pin 60 and a second laterally outwardly extending pin 62. An alignment tab 64 secures the pin 60 to a rearward end of the side elongated member 38 and an alignment tab 66 likewise secures the pin 62 to a rearward end of the side elongated member 40. The pins 60 and 62 may be attached to the alignment tabs 64 and 66 by any conventional means but are preferably welded to ensure adequate mounting capabilities of the divider bar. A first forwardly extending divider bar suspending member 68 and a second forwardly extending suspending member 70 are secured to the top 42 of the central elongated member 36 as is also shown in FIG. 6 and, as seen in FIG. 1, are each substantially planar in section. The purpose of the suspending members 68 and 70 is to provide suspending support to the central and side members of the divider bar when it is mounted within the mold cavity and an explanation as to how this is accomplished will now be made.

Figure 4:
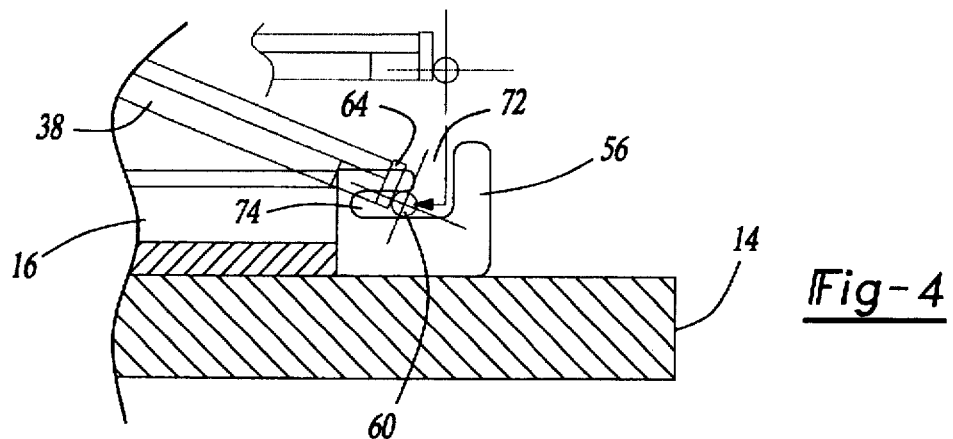
FIG. 4 is a view similar in nature to that shown in FIG. 3 and illustrating a divider bar mounting plate with vertically and horizontally extending slotted portions for enabling installation of the divider bar.

Referring to the rear sectional view of FIG. 4, a side view of the mounting assembly for receiving and for pivotally engaging the divider bar is shown. Specifically, the mounting plate 56 is provided with a pin receiving channel which is made up of a first downwardly vertically extending slotted portion 72 and a second forwardly and horizontally extending slotted portion 74. As is illustrated from the side view of FIG. 4, the pin 60 is located within the vertically extending slotted portion 72 until it seats within the mounting plate 56 in communication with the forwardly extending slotted portion 74. The opposite laterally extending pin 62 is likewise located within its associated vertical slotted portion in the mounting plate 58 and, upon both pins being seated upon the base of the vertical slotted portions, the divider bar 34 is rotated downwardly until the suspending members 68 and 70 engage upon the top 42 of the central elongated member 36 at which point the divider is located within the open top mold. An illustration of the completed installation of the divider assembly within the open-top mold can be seen upon reference to FIG. 5 wherein the mold and divider assembly is completely prepared for a second pour of material to create the built-up edge.

Figure 7:
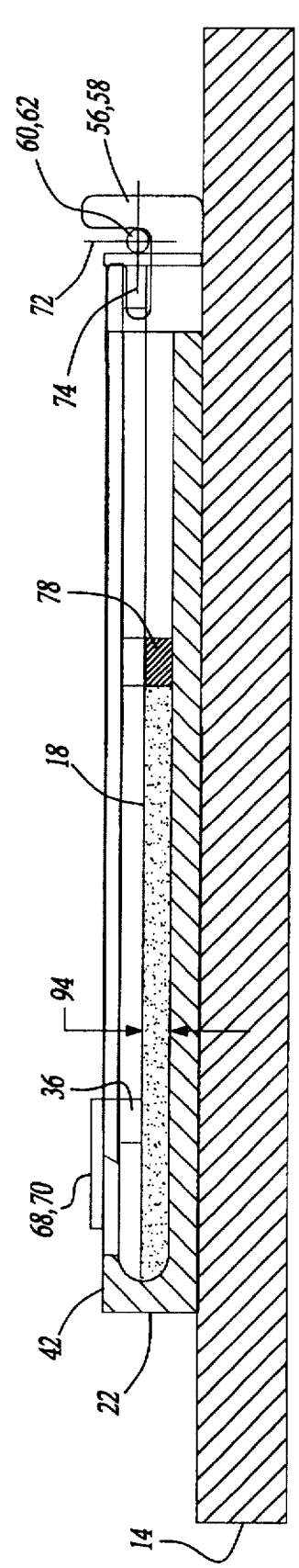
FIG. 7 is a cutaway view taken along line 7—7 of FIG. 5 and illustrating a cross section of the divider bar in place within the subdivided mold cavity and positioned in a first rearwardly translated position.
Figure 8:
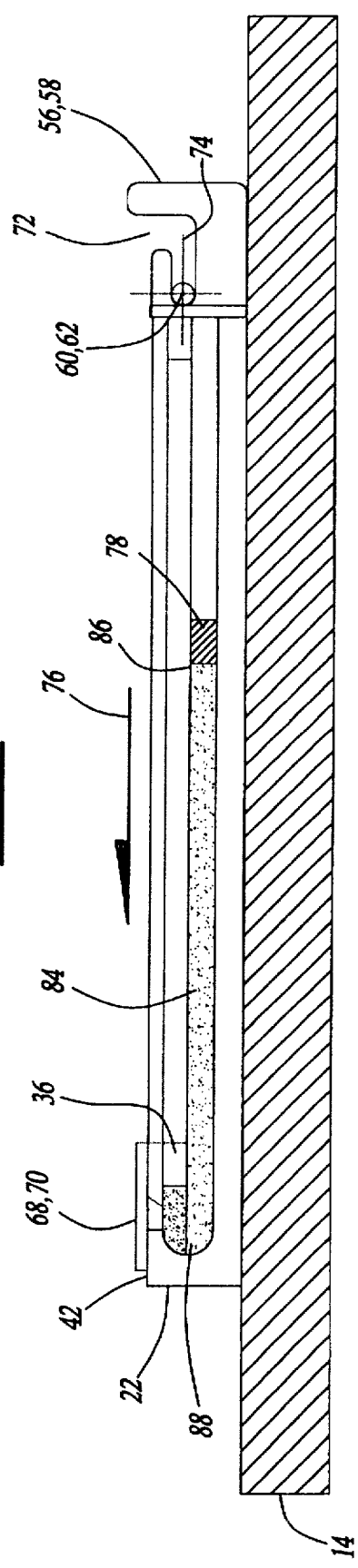
FIG. 8 is a cutaway view taken along line 8—8 of FIG. 5 through the mold length divider and illustrating the divider bar in a second forwardly translated position.
Figure 9:
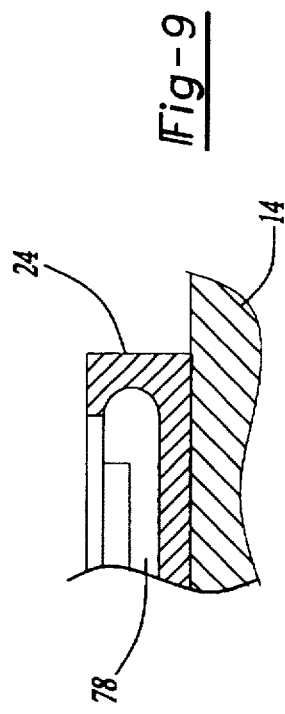
FIG. 9 is a cutaway view taken along line 9—9 of FIG. 2 and illustrating the sliding engagement of the width divider within one of the side contoured mold edges.

Referring now to FIGS. 7 and 8, in both figures the divider bar 34 is shown secured in place within the mounting plates and downwardly rotated in suspended fashion within the mold cavity. Referring to FIG. 7, the pins 60 and 62 are seated upon the base of the vertical slotted portions 72 within the mounting plates 56 and 58 and in contact with a rear interior surface within each of the mounting plates which defines a rearward extent of travel of the divider bar. Referring to FIG. 8, the divider bar is slidably engaged in forwardly translating manner along the direction of arrow 76 by sliding the pins forwardly within the horizontally extending slotted portions 74 until it contacts forward interior surfaces of the mounting plates which define a forward extent of travel of the divider bar. As is further seen from both FIGS. 7 and 8, the forwardly extending suspending members 68 and 70 are of sufficient length so that they will engage the top surface 42 of the central elongated member 36 no matter the relative positioning of the pins 60 and 62 within their associated slotted portions 74.

With reference again to FIGS. 1 and 2, a subdividing assembly is disclosed for creating a subset area within the open-top mold when it is desirable to produce a countertop having less than the overall dimensions of the mold 16. The subdividing assembly is particularly useful when it is desired to create a countertop according to one set of dimensions and then to rapidly change over to enable the creation of another countertop according to a second set of dimensions.

A width divider bar 78 is provided and is constructed of a polished stainless steel or other type of durable and non-adhering material. The width divider 78 is elongated in shape and is intended to be equal to the overall length of the open side 32 of the mold. The width divider is substantially square shaped in cross section and is further shaped at a first end 80 and a second end 82 in outwardly extending contours which match the associated inward contours of the first built-up mold edge 20 and the third built-up mold edge 24. The width divider 78 may therefore be slidingly engaged along both the sides 20 and 24 and may be movable in a direction either towards or away from the parallel and frontally positioned mold edge 22 to establish a linear distance between the width bar and the mold edge 22 which corresponds to the desired like dimension of the countertop to be produced.

A length divider bar 84 is arranged lengthwise upon the planar mold surface and corresponds in length to the linear distance separating the width bar 78 from the front contoured edge 22 of the mold. The length divider 84 is constructed of a similar material as the width divider 78 and is shaped in a general square manner in cross section similarly to the width divider 78. The length divider has a first square shaped end 86 which comes into abutting contact with the edge of the width divider 78 and a second outwardly contoured edge 88 which matches the inward contour of the mold edge 22 and which engages the edge upon the length divider being installed into the mold.

The arrangement of the dividers creates a subdivided area 90 within the mold for creating a countertop according to the desired dimensions. The dividers 78 and 84 are attached to the mold using adhesive or other releasably securing means so that they may be put in place quickly and easily according to the desired dimensions. Preferably, the length divider 84 comes in a kit of dividers according to different lengths and sizes, and a selected one of the length dividers is installed in place at a given lateral position between the width divider and the mold surface 22 to define a subdivided area for receiving the first countertop pour.

Referring again to FIGS. 2 and 3, a first pour 92 of a resin or other type of flowable plasticized material is made according to a given depth within the subdivided area 90 and according to a given depth 94 (about ½" or so and as illustrated from FIG. 7) until it fills the cavity bounded by the portion of the mold and the width and length dividers. Following the first pour, the material is allowed to set and to harden for a predetermined time period after which the divider bar is attached to the mounting plates and is downwardly rotated into the mold cavity until the suspending members 68 and 70 engage the top surface 42 of the mold front edge 22.

The divider bar is positioned within the mold so that the bottom surfaces of the elongated members touch the top of the first material pour 92 but do not exert any degree of force on the material. Because of the suspending members, the divider bar is allowed to be attached much earlier during the gelling process of the first pour than would otherwise be possible.

Figure 5:
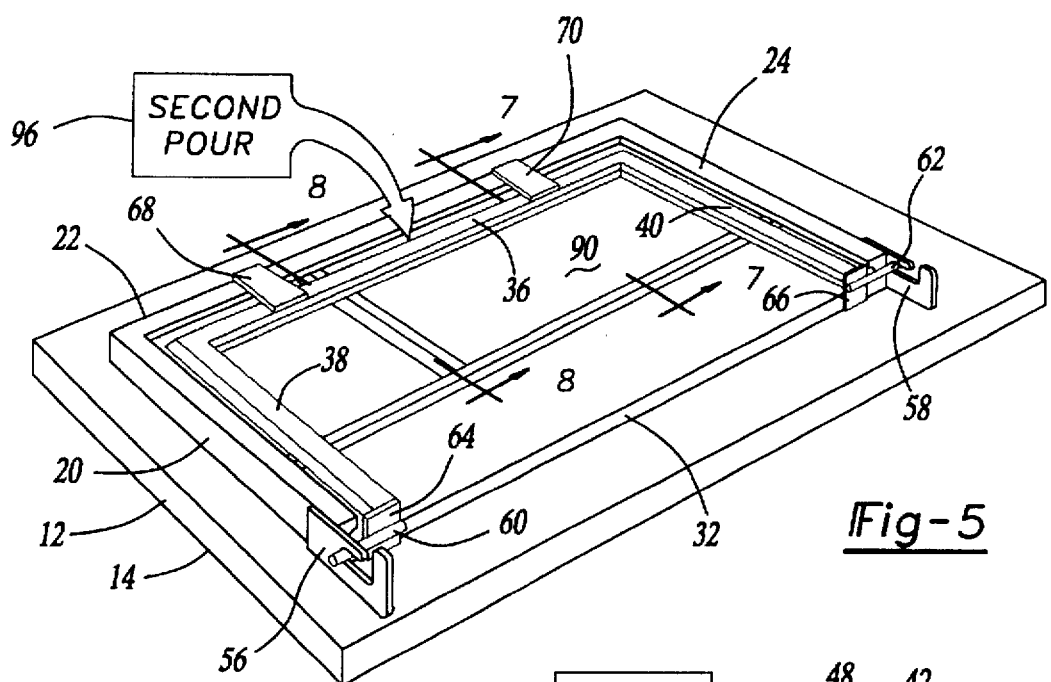
FIG. 5 is a view similar to that shown in FIG. 2 and illustrating the divider bar installed within the open-top mold and defining the second pour perimeter for creating the built-up edge.

The divider bar then is slided forwardly into its forward most position as shown in FIG. 7 and as viewed in perspective from FIG. 5. A second pour of material 96 (see FIGS. 5 and 6) is then applied in the perimeter channel created between the outwardly facing walls of the divider bar and the inwardly facing and contoured walls of the mold edges.

As is specifically shown in FIG. 6, the forwardly extending pour defining portion measures the amount of flowable material which is needed to create the built-up edge. An additional advantage of the divider assembly is that the divider bar may be slidably moved back to its rearward translated position as shown in FIG. 7 and may then be rotated upwardly and out of the way once a predetermined amount of curing and drying has occurred to the second pour of material 96. Any overflow or material beyond what is needed to create the built-up edge may then be conveniently removed by utilizing a sander or other type scraping device prior to the overflow hardening. The finished countertop product is then removed from the mold once a sufficient amount of curing has occurred. Furthermore, while the preferred embodiment anticipates utilizing first and second consecutive pours, it is also understood that the first and second layers can be created using other types of uncured and pre-cured nitrites or backers as desired.

Figure 10:
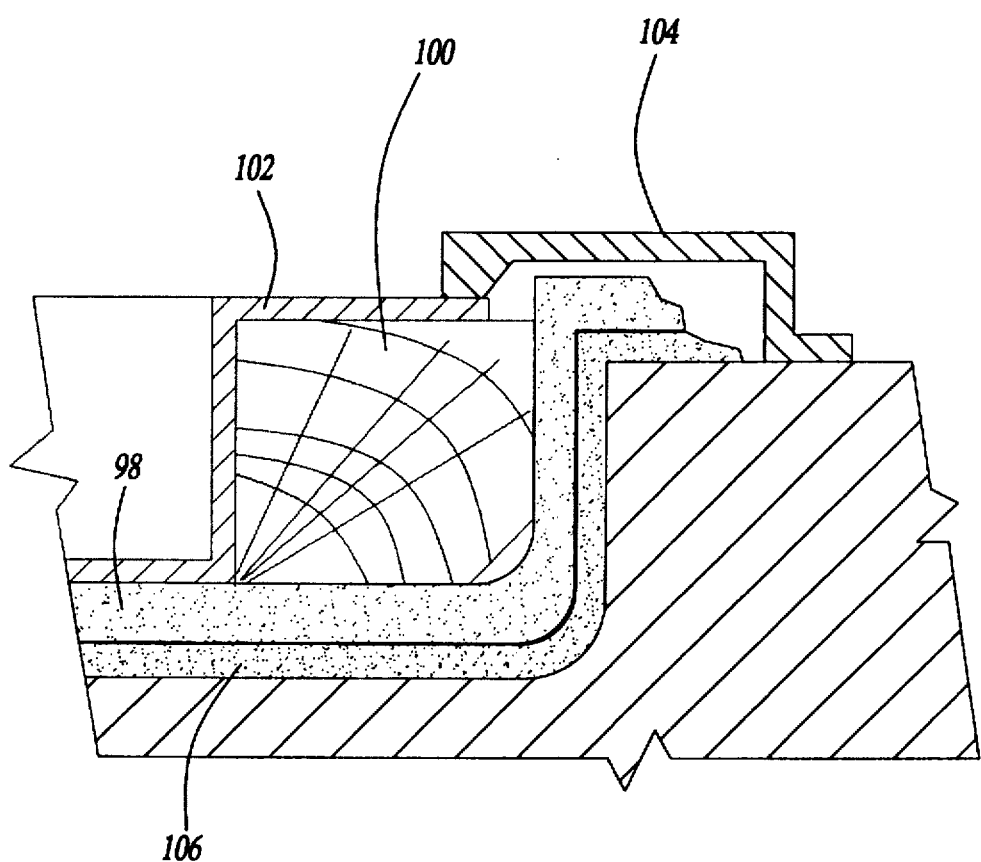
FIG. 10 is an alternative preferred embodiment of a single pour system utilizing a fiberglass matt backer system.

Specifically, in the case of a single pour of a non-flowing material, e.g. fiberglass mat or resin matrix of very high thixotropic material properties, the divider bar may be used to hold back or locate a batten or strip of pre-cured matrix, plywood strip or other suitable material. As shown in FIG. 10, a fiberglass backer 98 is sprayed or otherwise applied by one skilled in the art over a pre-cured exterior gelcoat of material which defines the mold surface. The backer 98 is permitted to sufficiently cure and shrink to a final dimension. A wooden batten 100 is shown in cross section and is shaped according to the desired profile of the mold. A light adhesive secures the batten 100 to a divider 102. The divider bar 102 is shown as an L-shaped member in cross section and is suspended above the mold by at least one suspending member 104. The wooden batten 100 is bonded to the fiberglass backer 98 using an appropriate adhesive. Once the adhesives have cured, the excess flashing of the poured material (gelcoat and backer 98) is trimmed by conventional means using the bottom edge of the plywood batten 100 as a guide. Therefore, the batten 100 serves as the built-up edge replacing the step of the second pour 96 previously described. A first pour of material 106 is applied in the same fashion as previously described.

It is understood that the features of the width and length dividers are an added advantage to the divider assembly and that the divider bar can be used without the dividers when it is desirable to produce a countertop according to the overall dimensions of the mold. The mold assembly is further useful in creating countertops for bathroom or kitchen applications in which it is desirable to have a wall to wall, left end or right end countertop piece. Once the countertop is completed, support members (not shown) may be attached to its underside and it may then be mounted atop a cabinet as desired.

It is also anticipated that a pneumatic release assembly can be provided for facilitating removal of the divider assembly from the first and second pours of material in a quick and easy non-stick fashion. This would entail an external source of a pressurized air which supplies the air through a channel formed in the divider bar and which feeds it through a selected number of apertures in the underside of the divider members to quickly disengage the divider bar.

A method for creating a countertop with a built-up edge according to the present invention is also disclosed and includes the above described steps for setting up the mold barriers, installing the divider bar, and effectuating the first and second pours.

Having described my invention, additional embodiments will become apparent to those skilled in the art to which it pertains without deviating from the scope of the appended claims.

I claim:

1. An adjustable divider assembly for use with an open-top mold for creating a countertop with a built-up edge, the mold being substantially rectangular in shape with first, second and third inwardly facing and contoured edge defining surfaces arranged in a substantially U-shape, and having a substantially planar surface which is bounded by the first, second and third edge defining surfaces, the planar surface extending to an edge of a fourth side of the mold, said divider assembly comprising:

a divider bar constructed of at least one elongated member, said divider bar further including a central elongated member and a first and a second side elongated member extending in perpendicular fashion from opposite ends of said central elongated member so that said divider bar forms a substantially U-shape matching the U-shape of the contoured edge defining surfaces and each of said elongated members having a flat outwardly facing edge and a flat bottom edge a pour defining portion extending from a top of each of said elongated members beyond said outwardly facing edge in a direction towards the associated inwardly facing and contoured mold defining edge; and means for securing said divider bar to the mold and means for locating said divider bar so that said elongated members are positioned in oppositely facing manner and at spaced distances with respect to the inwardly facing and contoured edges, said elongated members further being suspended at a predetermined height above the substantially planar surface of the mold;

such that when at least one layer of a material is applied over the planar surface of the mold and is equivalent in height to a bottom surface of the divider bar, a further material is applied to create a built-up edge in a channel created by said spaced distances between said elongated members and the inwardly facing and contoured mold edges.

2. The adjustable divider assembly according to claim 1, further comprising:

a width divider extending a length equal to that of the fourth open side of the mold and having ends which are shaped to be slidingly received within the second and third inwardly facing contoured edges so that said width divider is adjustable in a direction both towards and away from the first inwardly facing contoured edge; and a selected one of a plurality of elongated length dividers being inserted within the mold and corresponding in length to the distance separating said width divider and the first contoured edge, said length divider having a first flattened end contacting said width divider and a second outwardly contoured end matching the inward contour of the first mold edge;

said width divider and associated length divider creating a subset mold defining area within the mold upon which the first layer of material is deposited.

3. The divider adjustable assembly according to claim 2, said means for locating and said means for securing said divider bar to the mold further comprising:

a first mounting plate secured to and extending from the mold adjacent one end of the fourth open side and a second mounting plate secured to and extending from the other end of the fourth open side;

said mounting plates each further including a vertical slotted portion and a horizontal slotted portion extending beyond said vertical slotted portion in a direction towards the mold;

a first outwardly directed pin extending from an end of said first side elongated member of said divider bar and a second outwardly directed pin extending from an end of said second side elongated member; and at least one suspending member secured to said top of said central elongated member of said divider bar and extending forwardly a sufficient length to engage a top surface of the first contoured mold edge to position said divider bar above the planar surface of the mold;

said first and second pins being seated in said vertical slotted portions of said first and second mounting plates, said divider bar being rotated downward within the mold cavity so that said at least one suspending member contacts the mold top surface, and said divider being slided forwardly until said pins engage forward ends of said horizontal slotted portions.

4. The adjustable divider assembly as described in claim 3, further comprising a first alignment tab securing said first pin to said first side elongated member and a second alignment tab securing said second pin to said second side elongated member, said alignment tabs limiting the lateral displacement of said divider bar within the mold cavity.

5. The adjustable divider assembly as described in claim 1, further comprising an alignment notch formed in a rear of said bottom of said central elongated member for receiving an associated edge of a separate sink bowl.

6. An adjustable divider assembly for use with an open-top mold for creating a countertop having a built-up edge, the mold being substantially rectangular in shape with a planar surface, first, second and third built-up and inwardly contoured edges and a fourth open edge, said divider assembly comprising:

a divider bar having a central elongated member, a first side elongated member and a second side elongated member extending perpendicularly from opposite ends of said central elongated member, said divider bar forming a general U-shape which matches a U-shape of the first, second and third contoured mold edges, each of said elongated members including a flat outwardly facing edge, a flat bottom edge and an outwardly projecting pour defining portion;

means for pivotally attaching said U-shaped divider bar at opposite ends thereof along the fourth open edge of the mold so that said divider bar is rotated from a first upward and attaching position to a second downwardly rotated position within the mold;

at least one suspending member extending forwardly from said central elongated member and engaging an associated top surface of the mold to position said bottom edges of each of said elongated members at a predetermined height above the planar mold surface; and said means for pivotally attaching further comprising means for slidingly supporting said U-shaped divider bar at said opposite ends so that said bar is slidingly displaceable between a first rearward position and a second forward position to arrange said bar at a desired spaced distance opposite said contoured edges of the mold;

such that when a first layer of plasticized material is poured across the mold planar surface according to a predetermined depth, said divider bar is rotated into position within the mold following a predetermined cure time of said first layer, and so that when said bottom surfaces of said bar contact a top of the first layer, a second layer of material is poured into a channel created between said divider bar and said contoured mold edges to create the built-up edge.

7. An adjustable divider assembly for use with an open-top mold for creating a countertop with a built-up edge, the mold having a substantially planar surface which is bounded by first, second and third inwardly facing and contoured edged defining surfaces, the planar surface extending to an edge of a fourth side of the mold, said divider assembly comprising:

a divider bar constructed of a central elongated member and first and second elongated side members defining a U-shape; and means for securing said divider bar to the mold and means for locating said divider bar so that said elongated members are positioned in oppositely facing manner and at spaced distances with respect to the inwardly facing and contoured edges, said elongated members of said divider bar further being suspended at a predetermined height above the substantially planar surface of the mold;

such that when at least one layer of a material is applied over the planar surface of the mold and is equivalent in height to a bottom surface of the divider bar, a further material is applied to create a built-up edge in a channel created by said spaced distances between said elongated members and the inwardly facing and contoured mold edges, said further material hardening into a solid to form the built-up edge.

\* \* \* \* \*